United States Patent [19]

Baumbaugh et al.

[11] Patent Number: 4,809,232

[45] Date of Patent: Feb. 28, 1989

[54] HIGH SPEED, VERY LARGE (8 MEGABYTE) FIRST IN/FIRST OUT BUFFER MEMORY (FIFO)

[75] Inventors: Alan E. Baumbaugh, Batavia; Kelly L. Knickerbocker, Aurora, both of Ill.

[73] Assignee: The United States of America as represented by the United States Department of Energy, Washington, D.C.

[21] Appl. No.: 942,140

[22] Filed: Dec. 16, 1986

[51] Int. Cl.[4] .............................................. G11C 19/28
[52] U.S. Cl. ..................................... 365/221; 365/240
[58] Field of Search ............... 365/219, 220, 221, 240, 365/239; 377/67; 340/800

[56] References Cited

U.S. PATENT DOCUMENTS 4,733,376  3/1988  Ogawa ................................ 365/221

Primary Examiner—James W. Moffitt
Attorney, Agent, or Firm—Frank J. Kozak; Joseph P. Krause; Judson R. Hightower

[57] ABSTRACT

A fast FIFO (First In First Out) memory buffer capable of storing data at rates of 100 megabytes per second. The invention includes a data packer which concatenates small bit data words into large bit data words, a memory array having individual data storage addresses adapted to store the large bit data words, a data unpacker into which large bit data words from the array can be read and reconstructed into small bit data words, and a controller to control and keep track of the individual data storage addresses in the memory array into which data from the packer is being written and data to the unpacker is being read.

11 Claims, 2 Drawing Sheets

HIGH SPEED, VERY LARGE (8 MEGABYTE) FIRST IN/FIRST OUT BUFFER MEMORY (FIFO)

CONTRACTUAL ORIGIN OF THE INVENTION

The U.S. Government has rights in this invention under Contract No. DE-AC02-76CH03000 between the U.S. Department of Energy and Universities Research Association, Inc.

BACKGROUND OF THE INVENTION

This invention relates to digital data buffer circuits. Specifically, this invention is a method and apparatus for implementing a digital data buffer circuit, arranged as a first-in/first-out buffer, commonly known as a "FIFO". Digital data from a computer or other data source can be written into the "FIFO" at one rate while data can be read out of the "FIFO" at a later time by some other device at a possibly different rate in the same order in which the data was written in.

In digital data transfer applications, such as computer networks, digital data from a computer or other digital device is generated at some predetermined rate to be sent to another digital device with possibly a slower data transfer rate, i.e. a device incapable of receiving the data at the rate at which it is transmitted. A communications protocol is usually established between the machines whereby the receiving machine inhibits data transmission asynchronously when it is unable to reliably accept more data from the transmitter.

To reduce the time required to send data between two machines, buffer circuit or a "FIFO" can be connected between the sender and the receiver to smooth the transmission and reception of the digital data by allowing the sending machine to write or transmit data into the "FIFO" at its own rate without being interrupted by the receiving machine.

Where large blocks of digital data are to be exchanged between two computers at transmission rates above 100 megabytes per second, for example, a common problem in the transfer of the data is the inability of the receiving computer to accept data from the sending computer as fast as the sending computer can transmit the data. In real-time data acquisition systems, for example, where a data source outputs data at high rate, valuable information might be lost if the receiving device is unable to process the information in an orderly fashion, at the rate at which the data is generated. Where two computers are transferring large blocks of data between each other at high rates, the dead-time or wait-time that the sending computer must waste while waiting for the receiving system to "catchup" can be substantial because the computer receiving the data might have to repetitively interrupt data transmission from the sender.

Substantial time savings for the sending computer could be realized if there were a means provided to the sending computer to "dump" large blocks of data at high speed while simultaneously allowing the receiving computer to accept the data as it is able to, thereby freeing up the sending computer for other tasks much sooner than would otherwise be possible.

Existing buffer circuits or "FIFO" circuits typically use semiconductor memory devices to store data. Mechanical storage devices such as Winchester storage disks or magnetic tapes may also be used as temporary storage devices, however, currently available mechanical devices such as disks or magnetic tapes have read and write access times that are slow in comparison to most semiconductor devices. To accomodate high data transfer rates into and out of a "FIFO", i.e., over 100 megabytes per second, a semiconductor memory device must be used. Semiconductor memory devices that are currently available become more costly and consume more power as read/write access times decrease. In a "FIFO" architecture wherein large blocks of high-speed data words are to be buffered, i.e., more than $10^6$, 8-bit words, at speeds over $10^8$ bytes per second for example, the cost of currently available high-speed semiconductor memory devices capable of accepting data in the speed range of 100 megabytes per second becomes expensive; power consumption and the heat generated in a confined space becomes prohibitive.

Currently available metal oxide semiconductor dynamic random access memory devices, or MOS DRAMS as they are known in the art, despite being much more economical and consuming much less power, are currently unable to operate with read and write access times sufficiently short to transfer data at high rates, i.e. at or near 100 megabytes per second. It would be desirable to be able to store large amounts of data in a "FIFO" circuit using a variety of semiconductor memory devices, particularly MOS DRAMS whereby the cost per bit of storage is minimized and the electric power consumption minimized while "FIFO" capacity is maximized.

Accordingly, it is an object of this invention to provide a computer buffer circuit for storing and retrieving digital data.

Another object of this invention is to provide a buffer circuit capable of having a data transfer rate of at least 100 megabytes per second.

Another objective is to provide a buffer circuit with a storage capacity of at least 1 megabyte, minimizing the cost per bit of storage.

Another object is to provide a computer buffer circuit for storing and retrieving data on a Last-in/First-out basis.

Another object is to provide a computer buffer circuit for storing and retrieving data on a First-in/First-out basis.

Another object is to provide a computer buffer circuit for storing and retrieving data at rates up to $10^8$ bytes per second.

Additional objects, advantages and novelty of the invention will be set forth in part in the description which follows and in part will become apparent to those skilled in the art upon examination of the following or may be learned by practice of the invention.

SUMMARY OF THE INVENTION

To achieve the forgoing objects of the invention there is provided, an apparatus and method for buffering digital data from a data source in semiconductor memory. In the preferred embodiment of the buffer circuit, relatively low speed, low-cost, low power consumption, MOS DRAMS were used to store high-speed binary digital data on a First-in/First-out basis or "FIFO". However, virtually any type memory device that permits individual addressing of storage locations could be used instead of MOS DRAMS.

In the invention, high-speed, single-byte digital data words, from a video data acquisition system that generates a stream of such words, (each word comprised of a plurality of binary digits or bits) are concatenated into multi-byte digital words using relatively high-speed logic devices arranged to form a data packer that divides the data rate of the single byte high-speed data stream to a lower rate data stream comprised of multibyte data words. Concatenation of M, single byte data words (each word having N-bits) into a single multibyte word reformats an N-bit word from a data source into a (M×N)-bit word. In the embodiment, these (M×N)-bit words are again concatenated in a plurality of P, (M×N)-bit parallel shift registers, arranged to form a second data packer which forms a multi-byte word having (M×N×P)-bits of information, from P, (M×N)-bit words. The (M×N×P)-bit word formed by P, (M×N)-bit words is then written into a semiconductor memory array, arranged as an array of individually addressable memory locations, each location having at least (M×N×P)-binary digits. The preferred embodiment used MOS DRAMS for the memory array to minimize the cost and power consumption per bit of storage, however, other types of RAM could be used as well.

Write addresses and control signals for incoming data to the "FIFO" are generated internally in the buffer by means of a clock signal provided to the "FIFO" by the sending data source, or, alternatively derived directly from the incoming data stream. An internal priority encoder arbitrates the timing of writes, reads and refresh cycles for the dynamic ram array.

In the preferred embodiment, data is read out of the memory array into a first data unpacker comprised of a plurality of P, high-speed (M×N)-bit shift registers, each shift register having (M×N)-bits of data. Once into the array of P, (M×N)-bit shift registers, the original N-bit data words are recovered by successively clocking (M×N)-bit words from each (M×N)-bit shift register, in the first data unpacker, in sequence, into a second data unpacker which permits the original N-bit words to be recovered. M, N-bit words from the original data stream are recovered from the second data unpacker by being clocked out of the second unpacker, N N-bits at once, at a rate that is controlled by the system receiving the data.

In the preferred embodiment of the invention a "FIFO" buffer of 8 megabytes of 8-bit words, was constructed, which by using dynamic random access memories, consumed less than 35 watts of electric power. The read/write transfer rate of the buffer was in excess of $10^8$, 8-bit words per second using standard ECL and advanced low-power schottky transistor, transistor, logic ALSTTL in the concatenation circuitry.

In the preferred embodiment of the invention, data was stored and retrieved on a First-in/First-out basis. However, as will be apparent from the following description and claims, the invention also contemplates alternative embodiments where data is retrieved on a Last-in/First-out basis, by reordering the address sequencing of memory address generation.

DETAILED DESCRIPTION OF THE PREFERRED EMBODIMENT

Figure 1:
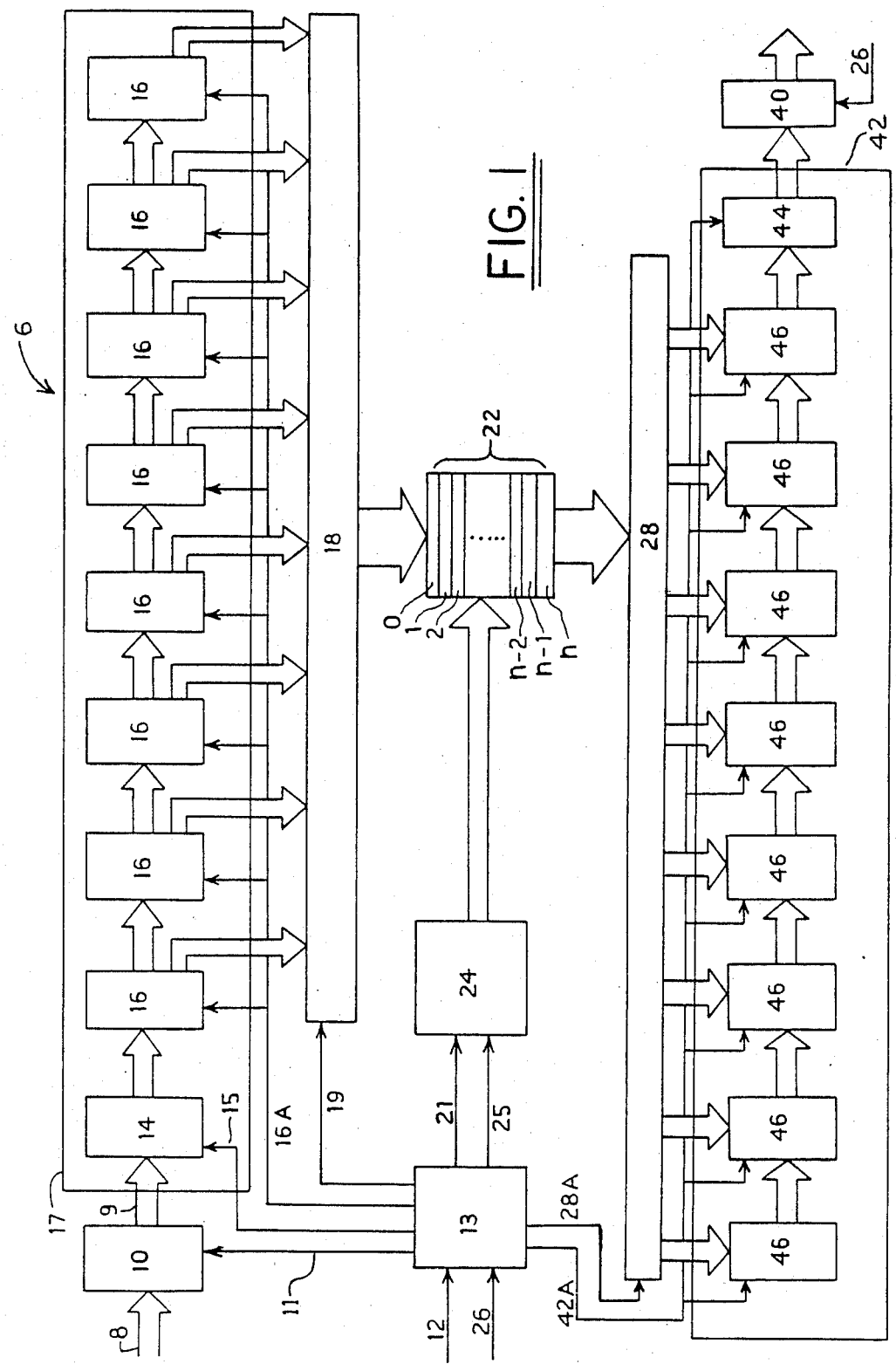
FIG. 1 shows a block diagram of the preferred embodiment of the "FIFO" architecture.

Referring to FIG. 1, there is shown a block diagram of a first-in/first-out buffer device 6, here after referred to as a "FIFO", wherein high-speed digital data is transferred to low-speed semiconductor memory devices. Data words to be stored in the "FIFO" originate from a sending device such as a computer, a data acquisition system or the like and can be continuously stored at rates up to $10^8$ 8-bit bytes per second. Data can be read out of the "FIFO" 6 at a possibly different rate than that of the data being written in, i.e. faster or slower.

In the FIFO 6 shown in FIG. 1, four, 8-bit bytes of data on data bus 8, are reformatted into a single, 32-bit data word by data packer 10, the output of which appears on data bus 9. In the preferred embodiment, data packer 10 was constructed of four, 8-bit emitter coupled logic (or ECL as it is known in the art) latches.

Figure 2:
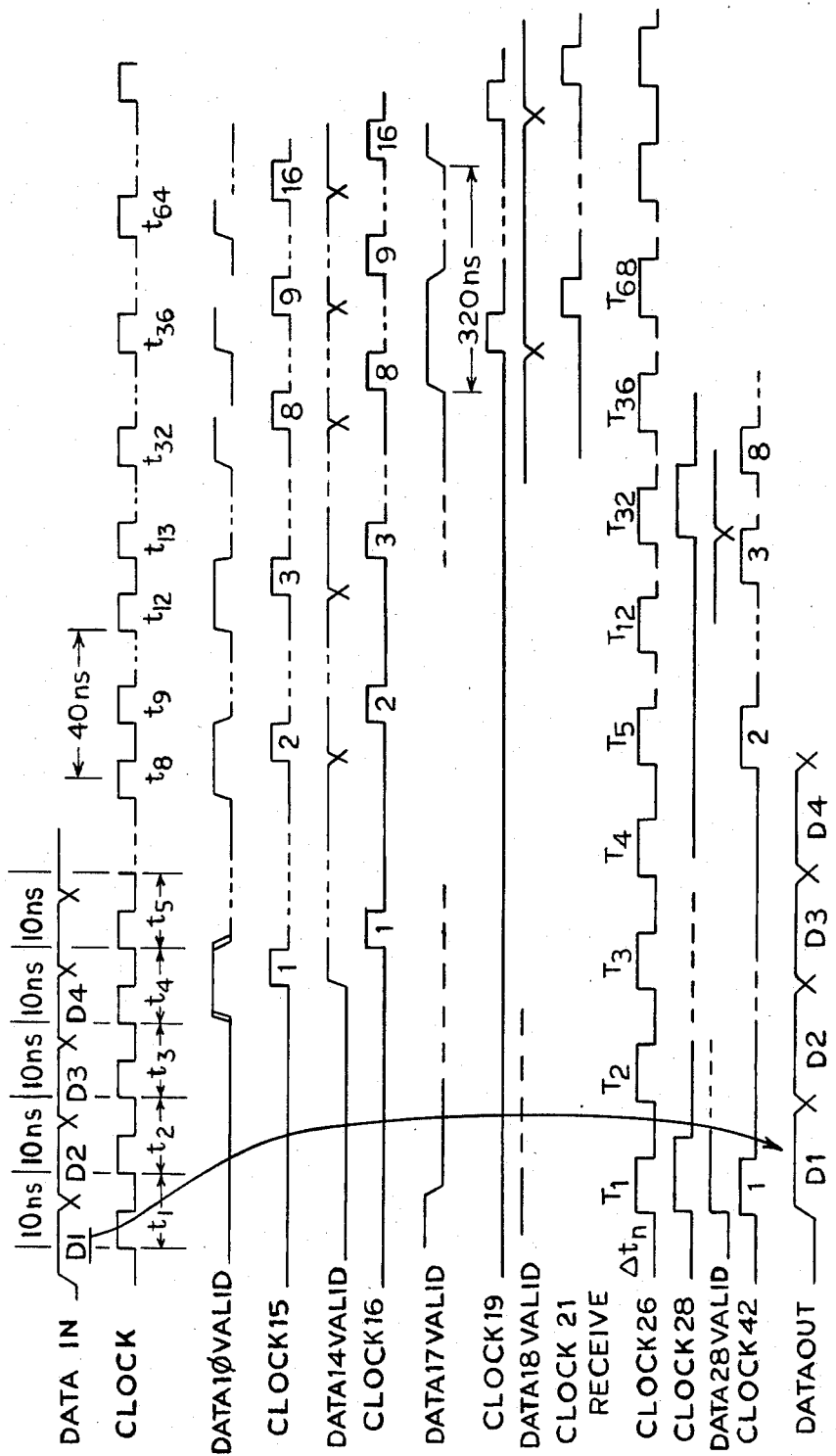
FIG. 2 shows a representative timing diagram of timing cycles required to move data into and out of a memory block, depicted in FIG. 1.

Specifically four, 8-bit ECL latches are used to form the 32-bit word, data is latched into the appropriate 8-bit latch on each clock pulse which in FIG. 2 is delivered on line 11. The 8-bit words are written into the latches in a circular fashion with a new 32-bit word being produced for every 4 clock pulses. A clock signal, shown in FIG. 2 as a pulse train labelled CLOCK in FIG. 2, having at least the same frequency as the original data stream of 8-bit data words on data bus 8, data must be delivered to data packer 10 after data on bus 8 is valid (See DATAIN in FIG. 2) for timing the formation of a 32-bit word. Four clock cycles $t_1$ through $t_4$, as shown in FIG. 2, are required by data packer 10, to generate a single 32-bit data word from four, 8-bit DATAIN data words D1, D2, D3 and D4.

In FIG. 1, clock pulses from the data source, or derived from the data stream itself, are delivered to "FIFO" control 13 on line 12 then to data packer 10 on line 11. Timing and control signals for the "FIFO", derived by control 13, use conventional logic timing circuits that are well known in the art. Referring to FIGS. 1 and 2, it can be seen that the clock pulses on line 12 as CLOCK supplied to control 13 must have a frequency equal to the data stream frequency to provide proper timing pulses to data packer 10 to permit data words from the data stream to be strobed into the data latches in data packer 10.

Referring to FIG. 2, after the occurrence of every 4th clock pulse, $t_4$, $t_8$, $t_{12}$, etc., delivered to data packer 10, the 32-bit word formed in data packer 10 valid, (shown as DATA10VALID), and is ready to be transferred by CLOCK15, on line 15 (shown in FIG. 1), into a first 32-bit latch, 14, which, together with the series 16, of 32-bit data latches forms a second data packer 17 which reformats, 32-bit data word output from data packer 10 into a single 256-bit data word the frequency of the occurrence of the 256-bit data word in data packer 17 being 1/32 the frequency of the original data stream on data bus 8.

As shown in traces in FIG. 2, 32-bit data words are presented valid in data packer 10 at DATA10VALID, after every 4th CLOCK pulse but before every 5th CLOCK pulse. After a 32-bit word is latched into latches 14 by CLOCK15, a pulse CLOCK16 occurs on line 16a which shifts the data from latch 14 into the first latch 16 of data packer 17, this same pulse is passed to all latches of packer 17 and acts to shift the data words from each latch 16 to the next latch 16, one shift per CLOCK16. This process must occur 8 times before an entirely new 256-bit word is valid in packer 17, represented by trace in FIG. 2 labeled DATA17VALID. This new word is passed to latch 18 by CLOCK19 in FIG. 2 on line 19 of FIG. 1. From FIG. 2, it can be seen that DATA17VALID occurs every 320 nanoseconds, 1/32 the frequency of the original data stream.

To meet the objective of the invention the devices selected for data packers 10 and 17 should have a characteristic operating speed sufficiently fast, ECL or TTL for example, to accommodate the data rate from the sending data source. In the preferred embodiment of the invention data packer 10 was constructed from ECL and data packer 17 was a logic family device, such as ALSTTL (Advanced Low-Power Schottky Transistor-Transistor Logic). Level shifting is of course required between ECL and TTL which can be accomplished using any appropriate device or method. Data packer 10 is constructed of 6-bit ECL latches (such as ECL device type 10176), an ECL counter (such as ECL device type 10136) to generate enabling pulses for the latches and an ECL multiplexer (such as ECL device type 10172) to steer 8-bit data bytes. Data packer 17 is constructed of a series of 74ALS374 D-type latches, well-known in the art. In the embodiment shown in FIG. 1, using ECL for data packer 10 and ALSTTL for data packer 17, 8-bit data bytes occurring at 108 bytes per second were reformatted into 256-bit words, at a rate of 3.125 megahertz.

After eight 32-bit data words are clocked into the 32-bit latches 16, in data packer 17, a clock signal on line 19 of FIG. 1 and shown in FIG. 2 as CLOCK19 latches the 256-bit word valid in data packer 17 into an input data latch 18, an optional temporary storage latch used in the preferred embodiment and comprised of a plurality of 8-bit TTL data latches, that provided a timing buffer between data packer 17 and the low speed memory array 22. Latch 18 data is shown valid in FIG. 2 as DATA18VALID and reduces the timing criticality of writes and reads into array 22, by latching the 256-bits of data in data packer 17 into latch 18 permitting immediate re-filling of data packer 17 and reducing the frequency of data "writes" to the memory array that would be necessary without latch 18.

Data may be strobed into the memory array 22 from latch 18 at any time during the 320 nanoseconds that are required to assemble another 256-bit word in data packer 17. In response to a timing signal 21 (corresponding to CLOCK21 of FIG. 2) from FIFO control 13, memory control 22 initiates a write cycle from latch 18 into memory array 22.

Timing pulses from control 13 to memory control 24 and "read-request" signals from the receiving computer that are delivered to memory control 24 are arbitrated by a priority encoder and address generator in memory control 24 which coordinates write, read and refresh cycles (when using DRAMS) for memory array 22. In the embodiment shown, write cycles were assigned the highest priority to permit uninterrupted data storage.

In the embodiment shown in FIG. 1, memory array 22 was comprised of 32, 256 k by 9-bit dynamic memory devices arranged in a linear array of individually addressable 256-bit word memory locations. An optional parity bit, available in the 9'th bit position of each 8-bit byte was not used. Hitachi DRAMS (part #50256) were used for memory array 22, however, virtually any random access storage device could be used in the storage array 22, subject to the requirement that each storage location be individually addressable.

When a data word is ready for transfer from the temporary data latch 18 to the memory array 22, a clock on line 21 in FIG. 1, provided to memory control 24 by control 13 and depicted in FIG. 2 as CLOCK21, enables the priority encoder and address generator in memory control 24 to generate an address and the write control signals to enable the data transfer of the 256-bit word in data latch 18 to the next available location in memory array 22.

Data written into memory array 22 by means of the write addresses generated in memory control unit 24, is read from the memory array 22 in a reverse process. Memory control unit 24 generates a read address which selects the appropriate location from which 256 bits of data are transferred to data unpackers which regenerate the original data stream.

In reading data from the "FIFO", at some later time $\Delta t_n$ shown in FIG. 2, the data processing system requesting data from the FIFO supplies a clock signal on line 26, shown in FIG. 1 at a frequency at which 8-bit data words are to be output from data unpacker 40. CLOCK26 shown in FIG. 2, is representative of the clock signal that might appear on line 26 and from a system requesting data, shown in FIG. 1. The four data words, D1, D2, D3 and D4 input at timing cycles $t_1$ through $t_4$ are shifted out of data unpacker 40 at $T_1$ thru $T_4$ as shown at DATAOUT in FIG. 2.

The clock from the data processing system supplied to the FIFO control 13 and in turn, supplied to memory controller 24, generates read addresses in memory controller 24 that start from the first address where data was written. 32 clock pulses from the data receiver increment the address of the next memory location accessed. (Note that a Last-in/First-out or LIFO operation could be implemented by rearranging the memory controller starting address and number to start from the last written address and thereafter decrementing the address count.)

The read address generated in memory controller 24 from CLOCK26 permits memory array 22 to output a 256-bit word (at CLOCK28 shown in FIG. 2 for illustration) to data latch 28, an optional 256-bit temporary data latch, analogous to the operation of latch 18, which facilitates data read timing, that holds a 256-bit word for the data unpackers.

Data valid in latch 28 at DATA28VALID shown in FIG. 2, is clocked from latch 28 into a first data unpacker 42 when the series 46 of 32-bit data latches in data unpacker 42 has been emptied of data by eight clock pulses, (CLOCK42 in FIG. 2), that are delivered to data unpacker 42 on line 42A shown in FIG. 1. Data unpacker 42 requires eight clock pulses to shift 8, 32-bit words out of the series 46 of 32-bit latches into a temporary data latch 44. From latch 44, 32-bit words are shifted to a second data unpacker 40, which, sequentially outputs 4, 8-bit words, to the data processing system requesting data by the clock delivered by the data processing system, on line 26 of FIG. 1. When data latches 46 have been emptied into latch 44, the content of latch 28 can thereafter be moved into the data unpacker 42, allowing the data read process to continue.

To accommodate high-speed data transfer from data unpackers 40 and 42, appropriate logic families must be selected and would of course be a design choice. ALSTTL was used for these two sub-systems of the "FIFO" in the preferred embodiment and provided a data transfer rate from the "FIFO" up to 30 megahertz.

Internally the "FIFO" shown in FIG. 1 is arranged as a 256-bit word array of individually addressed memory locations. Eight-bit data words from a data source to be saved in the "FIFO" are reformatted, four at a time, into 32-bit words. The 32-bit words are reformatted to 256-bit words which are written to a memory array 22.

In a similar manner 256-bit data words are read from the memory array 22, reformatted into 32-bit words which are reformatted into the original 8-bit data words. The 256-bit data words reformatted to 8-bit data words in the read process are read out of the "FIFO" in exactly the same order in which they where originally written in.

The embodiments in which an exclusive property right is claimed are as follows:

1. A buffer system for storing a stream of data words from a data source and retrieving the data words for delivery to a data processing system comprising:
    data packer means for forming a series of $(P \times M \times N)$-bit data words from a series, of $(P \times M)$ N-bit data words, said data packer means adapted to receive the data words from the data source;
    memory array means coupled to said data packer means and responsive to the formation of said series of words to receive at least $(P \times M \times N)$-bit data words from said data packer means, said memory array means having a plurality of individual data storage addresses for storing said series of $(P \times M \times N)$-bit data words;
    data unpacker means coupled to said memory array means and adapted to selectively receive $(P \times M \times N)$-bit data words from said memory array means for sequentially forming a series of N-bit data words from a corresponding series of $(P \times M \times N)$-bit data words stored in said memory array, for transmission to a data processing system;
    control means coupled to said data packer means, said memory array means and said data unpacker means for
        controlling the transfer of P $(M \times N)$ bit data words into and through said data packer means,
        controlling the transfer of $(P \times M \times N)$-bit data words from said data packer means into individual storage addresses of said memory array means,
        controlling the transfer of $(P \times M \times N)$-bit data words from the individual storage addresses of said memory array means to said data unpacker means, and
        controlling the transfer of P $(M \times N)$ bit data words through and out of said data unpacker means.

2. The buffer system of claim 1 where said memory array means is a semiconductor random access memory (RAM).

3. The buffer system of claim 1 where said memory array means is dynamic metal oxide semiconductor RAM and said control means includes means for refreshing said memory array means.

4. The buffer system of claim 3 where said data packer means and said memory array means are sized to store at least $10^8$, 8-bit data words from a data source per second.

5. The buffer system of claim 4 further including a temporary storage latch sized to store at least $(M \times N)$ binary digits, operatively connected between said data packer means and said memory array means to receive data words from said data packer means for temporarily holding $(M \times N)$-bit data words from said data packer means until said memory array means is available to store data words.

6. The buffer system of claim 4 including a temporary storage latch sized to store at least $(M \times N)$-binary digits, operatively connected between said memory array means and said data unpacker means, to receive data words from said memory array means for temporarily storing $(M \times N)$-bit data words for said data unpacker.

7. The buffer system of claim 4 including a first temporary storage latch sized to store at least $(M \times N)$-binary digits, said first latch operatively connected between said data packer means and said memory array means and a second temporary storage latch sized to store at least $(M \times N)$ binary digits, said second latch operatively connected between said memory array means and said data unpacker means.

8. The buffer system of claim 1 where said data packer means and said data unpacker means are comprised of a plurality of N-bit data latch circuits.

9. The buffer system of claim 1 where said control means controls the transfer of data through said data packer means, said memory array means and said data unpacker means on a last-in/first-out basis.

10. The buffer system of claim 1 where said control means controls the transfer of data through said data packer means, said memory array means and said data unpacker means on a first-in/first-out basis.

11. A method of storing and retrieving a high-speed stream of $(P \times N)$ N-bit data words comprising the steps of:
    conducting the stream of $(P \times M)$, N-bit data words into a data packer to form a series of $(P \times M \times N)$-bit data words corresponding to said $(P \times M)$, N-bit data words,
    storing said $(P \times M \times N)$-bit data words in a memory array at individual data storage addresses in said memory array sized to receive said $(P \times M \times)$-bit data words;
    retrieving said $(P \times M \times N)$-bit data words from the individual data storage addresses of said memory array and
    conducting said stream of $(P \times M \times N)$-bit data words into a data unpacker to reform said stream of M, N-bit data words for use by the data processing software.

* * * * *